US009219816B2

(12) United States Patent
Grayson

(10) Patent No.: US 9,219,816 B2
(45) Date of Patent: Dec. 22, 2015

(54) SYSTEM AND METHOD FOR AUTOMATED WHITELIST MANAGEMENT IN AN ENTERPRISE SMALL CELL NETWORK ENVIRONMENT

(71) Applicant: CISCO TECHNOLOGY, INC., San Jose, CA (US)

(72) Inventor: Mark Grayson, Maidenhead (GB)

(73) Assignee: CISCO TECHNOLOGY, INC., San Jose, CA (US)

(*) Notice: Subject to any disclaimer, the term of this patent is extended or adjusted under 35 U.S.C. 154(b) by 139 days.

(21) Appl. No.: 14/057,849

(22) Filed: Oct. 18, 2013

(65) Prior Publication Data

US 2015/0111534 A1  Apr. 23, 2015

(51) Int. Cl.
*H04W 12/06* (2009.01)
*H04M 3/493* (2006.01)
*H04W 4/16* (2009.01)

(52) U.S. Cl.
CPC .............. *H04M 3/4931* (2013.01); *H04W 4/16* (2013.01); *H04W 12/06* (2013.01)

(58) Field of Classification Search
CPC ........... H04W 4/16; H04W 4/18; H04W 8/26; H04W 12/06
USPC ............... 455/410, 411, 432.1, 433; 370/329, 370/331, 338
See application file for complete search history.

(56) References Cited

U.S. PATENT DOCUMENTS

2014/0199996 A1* 7/2014 Wang et al. ................. 455/426.1

OTHER PUBLICATIONS

"Cisco ASR 5000 Series Small Cell Gateway," Cisco White Paper, C11-711704-00, Cisco, Jul. 2012; 6 pages.
ETSI-TS-125-367-V9.4.0, "Universal Mobile Telecommunications System (UMTS); Mobility procedures for Home Node B (HNB); Overall description; Stage 2, (3GPP TS 25.367 version 9.4.0 Release9," ETSI, Jun. 2010, 17 pages.
"Extensible Authentication Protocol" from Wikipedia, the free encyclopedia; 10 pages; Sep. 16, 2013; 10 pages http://en.wikipedia.org/wiki/Extensible_Authentication_Protocol#EAP-FAST.
Haverinen, H., et al., "Extensible Authentication Protocol Method for Global System for Mobile Communications (GSM) Subscriber Identity Modules (EAP-SIM)," Network Working Group, RFC 4186, Jan. 2006; 93 pages.
Horn, Gavin, "Qualcomm: 3GPP Femtocells: Architecture and Protocols," Qualcomm Incorporated, 5775 Morehouse Drive, San Diego, CA 92121, Sep. 2010, 64 pages.
Nivaggioli, Patrice, "Cisco Small Cell Architecture," Cisco Connect, Dubrovnik, Croatia, South East Europe May 20-22, 2013; © Cisco and/or its affiliates. All Rights Reserved; 40 pages.
"Radius" from Wikipedia, the free encyclopedia; 12 pages; Sep. 26, 2013; 12 pages; http://en.wikipedia.org/wiki/RADIUS.

* cited by examiner

*Primary Examiner* — Sam Bhattacharya
(74) *Attorney, Agent, or Firm* — Patent Capital Group

(57) ABSTRACT

A method is provided in one embodiment and includes receiving a network address associated with a wireless device at a first network element in which the network address identifies the wireless device on a first network, and receiving user credentials from a directory service associated with a second network. The user credentials identify a user associated with the wireless device on the second network. The method further includes associating the user credentials with the network address, and communicating a request message to a second network element. The request message includes a request for a user identifier identifying the user on a third network. The method further includes receiving a response message from the second network element including the user identifier, associating the user credentials with the user identifier, and storing the association of the user credentials and the user identifier in a whitelist.

26 Claims, 8 Drawing Sheets

SYSTEM AND METHOD FOR AUTOMATED WHITELIST MANAGEMENT IN AN ENTERPRISE SMALL CELL NETWORK ENVIRONMENT

TECHNICAL FIELD

This disclosure relates in general to the field of communications and, more particularly, to a system and method for automated whitelist management in an enterprise small cell network environment.

BACKGROUND

Networking architectures have grown increasingly complex in communication environments. For example, femtocells have gained recent notoriety due to their capabilities, and because of their ease-of-use. In general terms, access points can operate in licensed spectrum to connect wireless devices to the network (e.g., using broadband connections). For a mobile operator, the access points can offer improvements to both coverage and capacity: particularly applicable to indoor environments. In addition to access by the public, access points can also offer to deliver the benefits of access by enterprise users. For many access point scenarios, differentiating between public access and enterprise access poses a number of problems for end users, enterprises and network operators alike.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION OF EXAMPLE EMBODIMENTS

Overview

A method is provided in one embodiment and includes receiving a network address associated with a wireless device at a first network element in which the network address identifies the wireless device on a first network, and receiving user credentials from a directory service associated with a second network. The user credentials identify a user associated with the wireless device on the second network. The method further includes associating the user credentials with the network address, and communicating a request message to a second network element. The request message includes a request for a user identifier identifying the user on a third network. The method further includes receiving a response message from the second network element including the user identifier, associating the user credentials with the user identifier, and storing the association of the user credentials and the user identifier in a whitelist.

In specific embodiments, the method further includes receiving an access request including an attaching user identifier. The access request is indicative of a request by an attaching wireless device to access one or more services of the second network. In specific embodiments, the method further includes determining whether the attaching user identifier matches the user identifier in the whitelist. In specific embodiments, the method further includes providing one or more services of the second network to the attaching wireless device based upon the user credentials associated with the matching user identifier in the whitelist when the attaching user identifier matches the user identifier in the whitelist.

In specific embodiments, the network address is a MAC address of the wireless device, and the first network includes a WiFi network. In other specific embodiments, the second network includes an enterprise network associated with the directory service. In other specific embodiments, the third network includes a cellular network. In other specific embodiments, the user identifier includes an International Mobile Subscriber Identity (IMSI).

In other specific embodiments, an Extensible Authentication Protocol (EAP) exchange is terminated prematurely after the user identifier has been recovered. In still other specific embodiments, the user identifier is recovered using the first network using an initial EAP-SIM exchange. In still other specific embodiments, the user identifier is recovered using the first network using an initial EAP-AKA exchange. In still other specific embodiments, the second network element includes a wireless controller.

Example Embodiments

Figure 1:
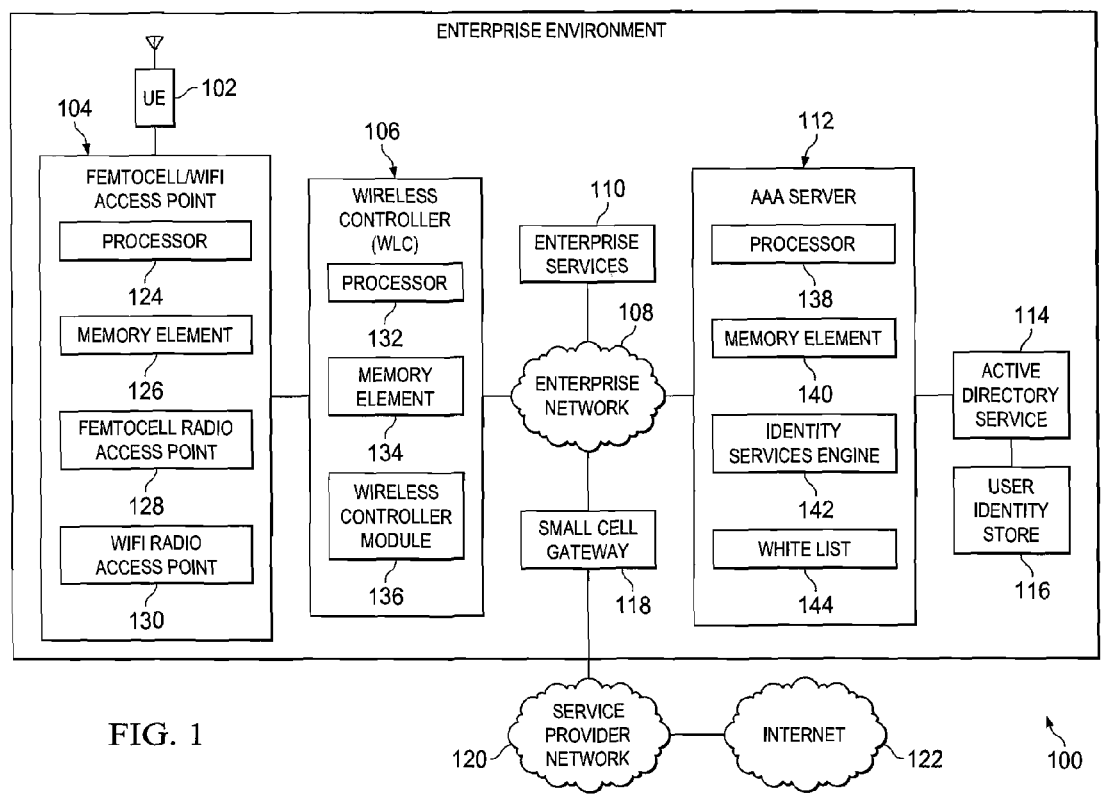
FIG. 1 is a simplified block diagram of a communication system for performing automated whitelist management in an enterprise small cell network environment in accordance with one embodiment of the present disclosure.

Turning to FIG. 1, FIG. 1 is a simplified block diagram of a communication system 100 for performing automated whitelist management in an enterprise small cell network environment in accordance with one embodiment of the present disclosure. FIG. 1 includes user equipment 102, femtocell/WiFi access point (AP) 104, wireless controller (WLC) 106, enterprise network 108, enterprise services 110, Authentication, Authorization and Accounting (AAA) server 112, active directory service 114, user identity store 116, small cell gateway 118, service provider network 120, and Internet 122. In the embodiment illustrated in FIG. 1, user equipment 102, femtocell/WiFi AP 104, wireless controller 106, enterprise network 108, enterprise services 110, AAA server 112, active directory service 114, user identity store 116, and small cell gateway 118 are located in an enterprise environment. Although FIG. 1 illustrates the femtocell as being co-located with the WiFi AP, it should be understood that in other embodiments the femtocell and WiFi AP may be located in different locations.

Wireless controller 106, enterprise services 110, AAA server 112, and small cell gateway are in communication with enterprise network 108. Wireless controller 106 is in further communication with femtocell/WiFi AP 104. User equipment 102 is in communication with femtocell/WiFi AP 104 via one or more of a WiFi connection and a femtocell connection. AAA server 112 is in further communication with active directory service 114, and active directory service is in further communication with user identity store 116. Small cell gateway 118 is in further communication with service provider network 120, and service provider network 120 is in further communication with Internet 122.

User equipment 102 is configured to include a femtocell radio capable of communicating using femtocell radio signals and a WiFi radio capable of communicating using WiFi radio signals. User equipment 102 can be associated with clients or customers wishing to initiate a communication in communication system 100 via some network. The term 'user equipment' is interchangeable with the terminology 'endpoint' and 'wireless device', where such terms are inclusive of devices used to initiate a communication, such as a computer, a personal digital assistant (PDA), a laptop or electronic notebook, a cellular telephone, an i-Phone, an i-Pad, a Google Droid, an IP phone, or any other device, component, element, or object capable of initiating voice, audio, video, media, or data exchanges within communication system 100.

User equipment 102 may also be inclusive of a suitable interface to the human user, such as a microphone, a display, a keyboard, or other terminal equipment. User equipment 102 may also be any device that seeks to initiate a communication on behalf of another entity or element, such as a program, a database, or any other component, device, element, or object capable of initiating an exchange within communication system 100. Data, as used herein in this document, refers to any type of numeric, voice, video, or script data, or any type of source or object code, or any other suitable information in any appropriate format that may be communicated from one point to another.

Femtocell/WiFi AP 104 includes a processor 124, a memory element, 126, a femtocell radio access point 128, and a WiFi radio access point 130. Processor 124 is configured to execute various tasks of femtocell/WiFi AP 104 as described herein and memory element 126 is configured to store data associated with femtocell/WiFi AP 104. Femtocell radio access point 128 is configured to communicate using a femtocell radio connection, such as a 3G or 4G connection, with user equipment 102. WiFi radio access point 130 is configured to communicate using a WiFi connection with user equipment 102. In general terms, AP 104 represents an access point device that can allow wireless devices to connect to a wired network using Wi-Fi, Bluetooth, WiMAX, UMTS, or any other appropriate standard. Hence, the broad term 'access point' is inclusive of a wireless access point (WAP), a femtocell, a hotspot, a picocell, a small cell, a WiFi array, a wireless bridge (e.g., between networks sharing same Service Set Identifier (SSID) and radio channel), a wireless local area network (LAN), or any other suitable access device, which may be capable of providing suitable connectivity to a wireless device. In certain cases, the access point connects to a router (via a wired network), and it can relay data between the wireless devices and wired devices of the network.

Wireless controller 106 includes processor 132, memory element 134, and wireless control module 136. Processor 132 is configured to execute various tasks of wireless controller 106 as described herein and memory element 134 is configured to store data associated with wireless controller 106. Wireless control module 136 is configured to perform the various operations of wireless controller 106 including whitelist management operations as described herein. Enterprise services 110 may include one or more network services provided by enterprise network 108.

AAA server 112 includes processor 138, memory element 140, identity services engine 142, and whitelist 144. Processor 138 is configured to execute various tasks of AAA server 112 as described herein and memory element 140 is configured to store data associated with AAA server 1112. Identity services engine (ISE) 142 is configured to perform whitelist management operations associated with AAA server 112 as described herein. Whitelist 144 includes a whitelist of user identities mapped to IMSIs that are authorized to access specific resources of the femtocell/WiFi AP 104. In particular embodiments, whitelist 144 may further include user classification information associated with each user identity to indicate a class of enterprise services/resources that are available to the user associated with the user identity. In particular embodiments, the resources able to be accessed by whitelisted users includes priority resources of the femtocell/WiFi AP 104. In still other embodiments, the resources able to accessed includes services provided by the Small Cell Gateway 118.

Note that before detailing some of the operational aspects of FIG. 1, it is important to understand common characteristics of radio access points, femtocells, etc. as they generally operate in commercial architectures. The following foundational information is offered earnestly for purposes of teaching and example only and, therefore, should not be construed in any way to limit the broad teachings of the present disclosure. In many architectures, femtocells can be deployed as autonomous units to improve reception in areas with poor coverage, or within buildings where coverage is reduced by the structure itself. Wireless devices that are attached to (and in communication with) femtocells can have their data transmissions routed to the service provider's network (e.g., over the internet, over any suitable network, etc.). Thus, the access point (e.g., the femtocell) operates as a mini tower for the proximate user. However, the coverage provided by the access point is generally open to anyone within range: unless configurations operate to limit access to the network to only those individuals duly authorized for access.

Essentially, femtocells are fully featured (but low-power) wireless device base stations. Femtocells can be connected using standard broadband digital subscriber line (DSL) or cable service into the service provider's network. Femtocells offer excellent wireless device coverage at home for voice, data, etc., but at a lower cost than an arbitrary outdoor service. In operation, when in range of the femtocell (e.g., in a residential environment), a wireless device can automatically detect the femtocell, and subsequently use it (as a preference over outdoor cell sites). Calls can be made and received, where the signals are sent (potentially encrypted) from the femtocell via the broadband IP network to one of the mobile operator's main switching centers. Typically, femtocells operate at low radio power levels (e.g., less than cordless phones, WiFi, or many other household equipment). This can substantially increase battery life for wireless devices: both on standby and talk time. Additionally, because wireless devices are much closer to the femtocell, call quality is excellent and data devices can operate at full speed. Larger femtocell designs intended for business use (i.e., enterprise) can readily handle 8, 16, 32, etc. concurrent calls.

Residential Femtocell users do not want open access to their femtocells. The main concern is paying extra for broadband internet usage, which might arise from unknown visitors who make extensive use of someone else's equipment. Other issues include reduced performance of broadband because the backhaul is being shared with unwelcomed visitors, where this unlawful access may further affect the performance of other computers, laptops, and other connected devices. Additionally, security concerns are prevalent in many of these architectures such that some type of spoofing and/or validation should systematically occur. In enterprise environments, there may be benefits of enabling public access to the licensed access point. Benefits may include improved capacity and coverage to enterprise visitors and contractors. However, enterprises may wish to restrict access to enterprise services to certain users of the femtocell based upon one or more classifications of users. For example, an enterprise may wish to limit certain enterprise services/resources to employees of the enterprise while allowing visitors to access other services/resources.

Separately, it should be noted that networks can leverage International Mobile Subscriber Identity (IMSI) data, which can uniquely identify a user (e.g., the SIM card). This means that an architecture should translate any phone number entered into an IMSI, which can be used by the femtocell to grant/deny access for the network. Typically, a Home Location Register (HLR) within the service provider network maintains the database that maps these number systems together. It should also be noted that people constantly change their phones, their networks, their phone numbers, etc. These individuals also lose their phones, which can be replaced with a new SIM card that may (or may not) retain the same number. In an enterprise context, employees may leave the company and the enterprise may wish to remove access to the enterprise services/resources via the femtocell network to the former employees. These changes should be propagated to a femtocell whitelist to ensure continued access for those users authorized for network access.

Residential femtocells are typically closed access, meaning that as part of the provisioning process telephone numbers that are authorized to access the femtocell are entered within backend systems of the service provider, and the telephone numbers are converted to IMSIs which are provisioned into the whitelist of the femtocell system itself. When a user wishes to register with the femtocell with particular user equipment the user typically enters a Mobile Subscriber Integrated Services Digital Network-Number (MSISDN) and the service provider will map the MSISDN to an IMSI and then provision such on a Home Node B (HNB) infrastructure of the service provider. When the user subsequently wishes to access the femtocell, the femtocell will query the user equipment for the IMSI. If the IMSI is in the whitelist the user is granted access to the femtocell, otherwise the user is denied access.

In an enterprise context, the concept of closed access still exists but because of other factors such as market drivers, the enterprise may desired to set up a hybrid access system in which one set of users is authorized by the enterprise to access a certain set of services, and the other sets of users, such as visitors, are allowed to access other services. For example, if a particular user is identified as an enterprise employee, the user may be allowed access to differentiated services such as local LAN access. In addition, such a hybrid access system may be for resource partitioning. For example, if the enterprise network is congested, the femtocell may be configurable to allocate a certain percentage of resources to enterprise employees.

In conventional approaches to femtocell deployment, IMSI whitelists are managed by the service provider. Future enterprise architectures will include differentiated capabilities for enterprise users such as voice integration or enterprise LAN access. Such approaches will require a foundational capability to handle massively scalable whitelists. Furthermore, whitelist management will need to accommodate "bring your own device" (BYOD) evolution in which employees may bring personally owned mobile devices (laptops, tablets, smart phones, etc.) to their workplace, and use those devices to access privileged company information and applications. In addition, whitelist management will need to quickly accommodate employee changes by the enterprise.

Accordingly, various embodiments described herein provide for an enterprise HNB system having the capability to allow an enterprise to autonomously manage its own femtocell or other small cell whitelists and/or offer differentiated services for whitelist members. In one or more embodiments, enterprise WiFi architecture is leveraged to build an enterprise femtocell whitelist by automatically associating or mapping enterprise credentials of a user obtained using WiFi authentication with an IMSI, and automatically generating the whitelist for use within the femtocell network.

In accordance with the teachings of the present disclosure, in various embodiments communication system 100 is configured to build on the foundation of BYOD based authentication using Extensible Authentication Protocol (EAP) messaging such as described in RFC 4186 based upon using Active Directory authentication or another directory service provided for WiFi access. Using a directory service approach helps ensure that the device owner has valid enterprise credentials. In particular embodiments, the enterprise system is provided with the ability to record the Wi-Fi MAC address of the user equipment 102. In other particular embodiments, the enterprise system is provided with the ability to send an EAP-REQUEST/SIM/START message encoded as per RFC 4186 to user equipment 102 previously authenticated to enterprise network 108 and identified using a common Wi-Fi MAC address, and user equipment 102 responds with the IMSI associated with user device 102. The EAP-REQUEST/SIM/START message includes a request for user equipment 102 to respond with an indication of the IMSI associated with user equipment 102. In specific embodiments, an AT-PERMANENT-ID-REQ attribute will be included within the EAP-REQUEST/SIM/START message requiring the RFC 4186 compliant supplicant (e.g., user equipment 102) to respond to the enterprise system with its IMSI. The enterprise system will then, after it has recovered the IMSI, terminate the EAP-SIM operation, e.g., using an EAP-SIM notification packet as specified in Section 6 of RFC 4186. In still other embodiments, an EAP-AKA protocol may be used instead of an EAP-SIM protocol.

The enterprise system has then recovered the IMSI for the authorized enterprise user and is then operable to provision such information in the whitelist of the HNB enterprise system, e.g., provisioning such in the HNB for potential differentiated handling of enterprise IMSIs compared to other IMSIs, or provisioning such in an enterprise controller for integration of enterprise users with the enterprise voice PBX. In particular embodiments, one or more timers may be used to age out associations and ensure that as a user's enterprise credentials are invalidated, the associated IMSI mapping is removed.

In one or more embodiments, one or more advantages may be provided including allowing whitelists to be autonomously managed by the enterprise, building clear linkages between enterprise HNB and WiFi networks, and enabling whitelist management to be integrated into enterprise credential management workflow operations, thus enabling immediate provision of IMSI whitelists once a user is authenticated on the WiFi network.

In an example operation of communication system 100, when user equipment 102 is within the range of femtocell/WiFi AP 104, the user is authenticated onto the WiFi network of the enterprise by ISE 142 using active directory credentials obtained by active directory service 114 from user identity store 116. In one or more embodiments, the human resource (HR) systems of the enterprise are tied into active directory service 114 to allow rapid updating of user identity store 116 due to a change in employee status. In a particular embodiment, EAP-FAST messaging is used to authenticate the user.

In one embodiment the ISE can associate the Wi-Fi MAC address of the user equipment 102 with the enterprise credentials recovered from the user identity store 116. ISE 142 then triggers the sending of an EAP-SIM message (or EAP-AKA message) to user equipment 102 including a request for the IMSI associated with user equipment 102. User equipment 102 will then send a response including the IMSI associated with user equipment 102 to be received by ISE 142. In one embodiment, the response will be signaled along with the Wi-Fi MAC address of the user equipment 102. As a result, ISE 142 knows the user is authentic, knows the enterprise user identity (e.g., the active directory user identity credentials) associated with the user, and knows the IMSI associated with user equipment 102. ISE 142 may then generate whitelist 144 including the mapping of the enterprise user identity and the IMSI associated with user equipment 142. The enterprise may then autonomously manage the whitelist of users, no longer having to rely on the service provider to manage the whitelist. Providing for whitelist management to authorize users totally within the enterprise domain allows the enterprise to prevent the service provider from allowing access to enterprise network 108 that is not authorized.

In one example implementation, femtocell/WiFi AP 104, wireless controller 106, and/or AAA server 112 are network elements that facilitate or otherwise help coordinate whitelist management activities (e.g., for networks such as those illustrated in FIG. 1). As used herein in this Specification, the term 'network element' is meant to encompass network appliances, servers, routers, switches, gateways, bridges, loadbalancers, firewalls, processors, modules, base stations, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, femtocell/WiFi AP 104, wireless controller 106, and/or AAA server 112 include software to achieve the whitelist management operations, as outlined herein in this document. In other embodiments, this feature may be provided external to these elements, or included in some other network device to achieve this intended functionality. Alternatively, both elements include software (or reciprocating software) that can coordinate in order to achieve the operations, as outlined herein. In still other embodiments, one or both of these devices may include any suitable algorithms, hardware, software, components, modules, interfaces, or objects that facilitate the operations thereof.

Figure 2A:
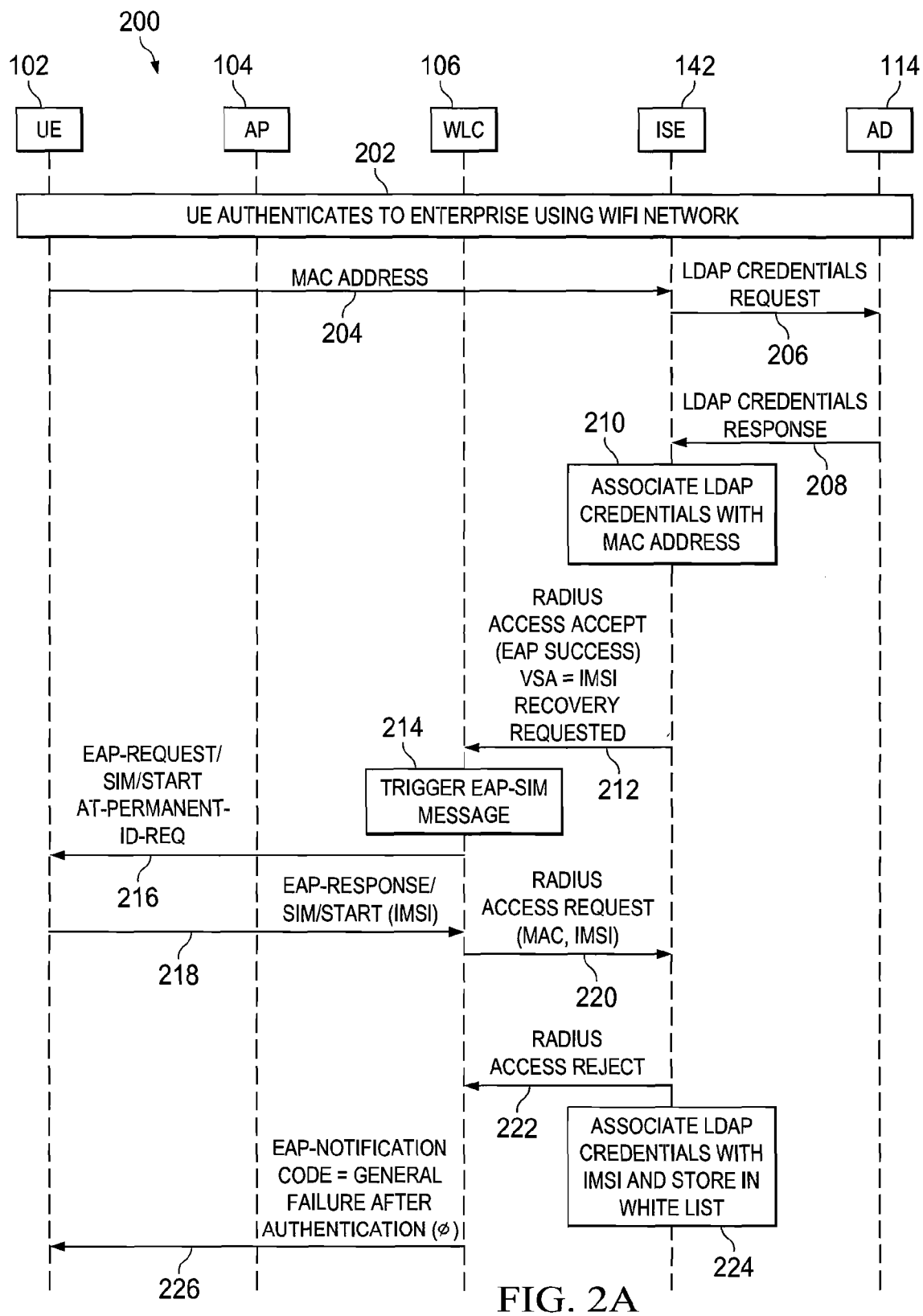
FIGS. 2A-2B are a simplified flow diagram depicting a flow associated with whitelist management according to one embodiment.
Figure 2B:
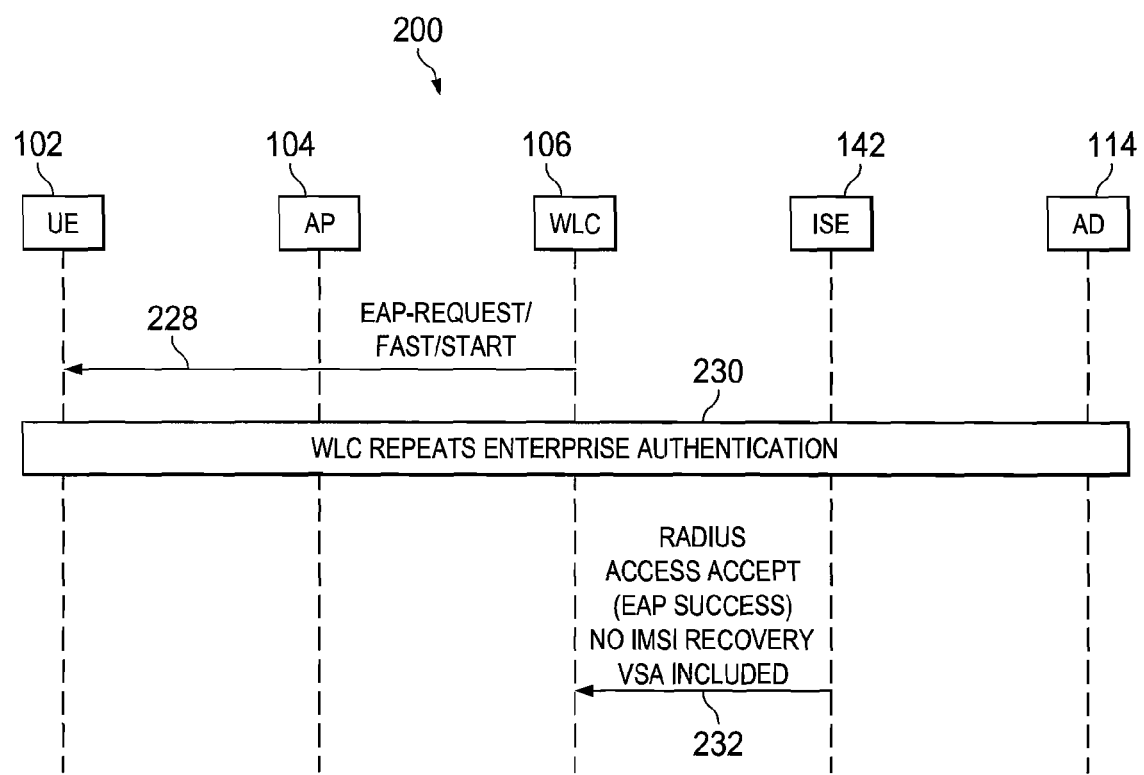

Referring now to FIGS. 2A-2B, FIGS. 2A-2B are a simplified flow diagram depicting a flow 200 associated with whitelist management according to one embodiment. In this particular flow 200, user equipment (UE) 102 authenticates with the enterprise using the WiFi network through ISE 142 via enterprise user credentials associated with user equipment 102. ISE 142 authenticates the enterprise user credentials through active directory (AD) 114, requests the IMSI associated with user equipment 102, and generates whitelist 144 including an association of the enterprise user credentials with the IMSI as will be further described herein. In 202, user equipment 102 authenticates to ISE 142 of the enterprise using the WiFi network of the enterprise. In a particular embodiment, user equipment 102 authenticates with ISE 142 using Extensible Authentication Protocol (EAP) messaging such as described in RFC 4186 based upon using Active Directory authentication information received from AD 114. In 204, ISE 142 receives a MAC address associated with user equipment 102 from user equipment 102. In a particular embodiment, the MAC address is an IEEE MAC-48 address. In 206, ISE 142 sends a Lightweight Directory Access Protocol (LDAP) credentials request to AD 114. The LDAP credentials request includes a request for AD 114 to provide enterprise user identity credentials, such as LDAP credentials, associated with the MAC address. In 208, AD 114 retrieves the LDAP credentials from user identity store 116 and sends an LDAP credentials response including the LDAP credentials to ISE 142.

In 210, ISE 142 associates the LDAP credentials of the user with the MAC address of user equipment 102. In 212, ISE 142 sends a RADIUS Access Accept (EAP Success) message to WLC 106. In particular embodiments, the RADIUS Access Accept (EAS Success) message includes a Vendor-Specific Attribute (VSA)="IMSI Recovery Requested" indicating that ISE 142 is requesting that WLC 106 initiate recovery of the IMSI of user equipment 102. While RADIUS is utilized in the present disclosure, it is to be understood that DIAMETER, TACACS, TACACS+, or any other suitable protocol could readily be utilized in its place. In 214, WLC 214 triggers the sending of an EAP-SIM message in response to receiving the RADIUS Access Accept message. In 216, WLC 106 sends an EAP-REQUEST/SIM/START message having an AT-PERMANENT-ID-REQ syntax included therein to user equipment 102. The AT-PERMANENT-ID-REQ syntax indicates to user equipment 102 that WLC 106 is requesting the IMSI of user equipment 102. In 218, user equipment 102 sends an EAP-RESPONSE/SIM/START message including the IMSI associated with user equipment 102 to WLC 106.

In 220, WLC 106 sends a RADIUS Access Request message including MAC address and the IMSI associated with user equipment 102 to ISE 142. In 222, ISE 142 sends a RADIUS Access Reject message to WLC 106. In 224, ISE 142 associates the LDAP credentials with the IMSI and stores the association of the LDAP credentials and IMSI in whitelist 144. Because the enterprise may not have the capability to complete a full EAP-SIM procedure because it may not be attached to an HLR and is not a service rider, a procedure to terminate the EAP-SIM procedure is initiated. Accordingly, In 226 WLC 106 sends an EAP-NOTIFICATION message to user equipment 102. In one embodiment the EAP-NOTIFICATION message may include a code=General failure after authentication (0).

Because it is necessary to ensure that user equipment 102 gets back on the enterprise network, an EAP exchange is initiated. In 228, WLC 106 sends an EAP-REQUEST/FAST/START message to user equipment 102. In 230, WLC 106 repeats enterprise authentication for user equipment 102. In 232, ISE 142 sends a RADIUS Access Accept (EAP Success) message to WLC 106 which does not include the IMSI Recovery VSA described above. Accordingly, flow 200 of FIGS. 2A-2B to associate an Enterprise identity credential with an IMSI automatically generates whitelist 144 to enable the offering of differentiated services to enterprise employees such as prioritized resources or access to the enterprise service environment. In accordance with various embodiments, it may be necessary to perform the flow of FIGS. 2A-2B once for a particular user equipment device since the mapping of the enterprise credentials and IMSI is stored and available for future use for a subsequent access for the user equipment.

Figure 3:
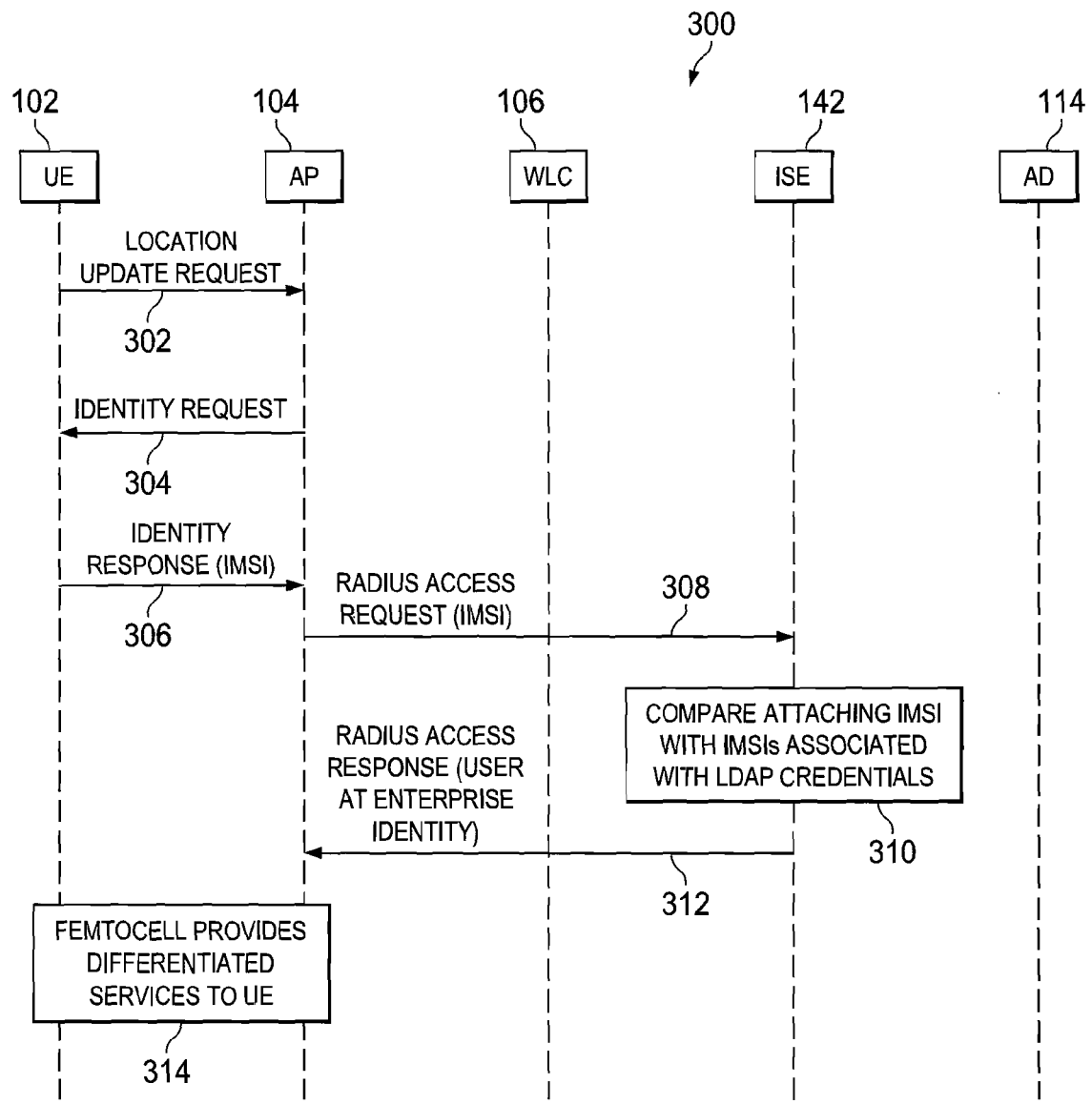
FIG. 3 is a simplified flow diagram depicting a flow associated with access of user equipment to the enterprise network using a previously generated whitelist according to one embodiment.

Referring now to FIG. 3, FIG. 3 is a simplified flow diagram depicting a flow 300 associated with access of user equipment 102 to the enterprise network using a previously generated whitelist according to one embodiment. In the embodiment of FIG. 3, ISE 142 is provisioned within whitelist 144 by flow 200 as described with respect to FIGS. 2A-2B. In 302, user equipment 102 sends a Location Update Request to AP 104 indicating that user equipment 102 is requesting access to the enterprise network. In 304, AP 104 sends an Identity Request message to user equipment 102 requesting the IMSI associated with user equipment 102. In 306, user equipment 102 sends an Identity Response message including the IMSI associated with user equipment 102 to AP 104. In 308, AP 104 sends a RADIUS Access Request message to ISE 142 including the IMSI.

In 310, ISE 142 compares the attaching IMSI received in the RADIUS Access Request message with IMSIs associated with LDAP credentials stored in whitelist 144. If the received IMSI matches an IMSI stored in whitelist 144, ISE 142 sends a RADIUS Access Response to AP 104 in 312. In one or more embodiments, the RADIUS Access Request message may include the user enterprise identity, such as the LDAP credentials. In 314, the femtocell provides differentiated enterprise services to user equipment 102. In particular embodiments, the differentiated enterprise services may be based upon a classification of the user associated with user equipment 102 such as whether the user is an employee of the enterprise.

Figure 4A:
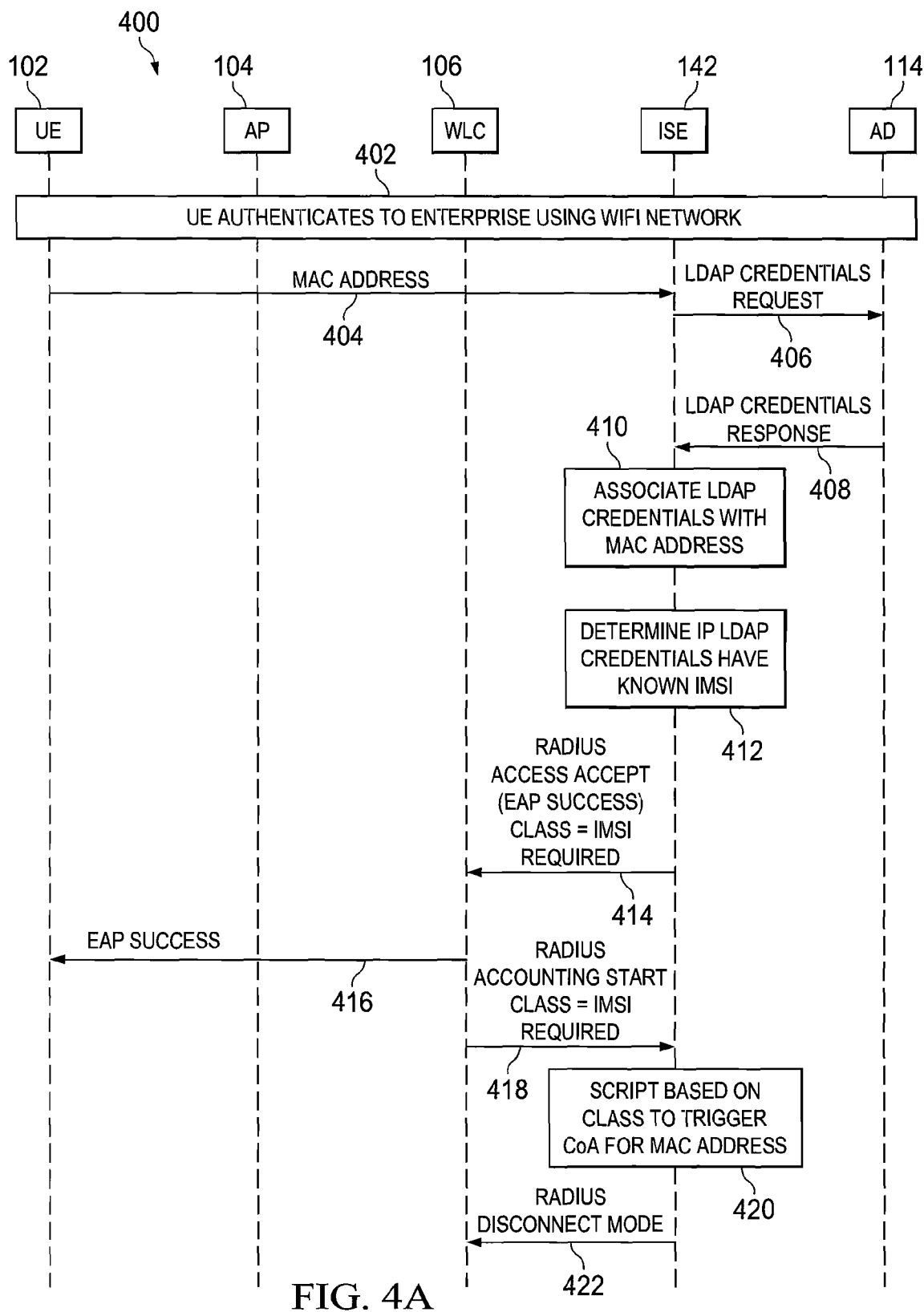
FIGS. 4A-4C are a simplified flow diagram depicting a flow associated with whitelist management according to another embodiment.
Figure 4B:
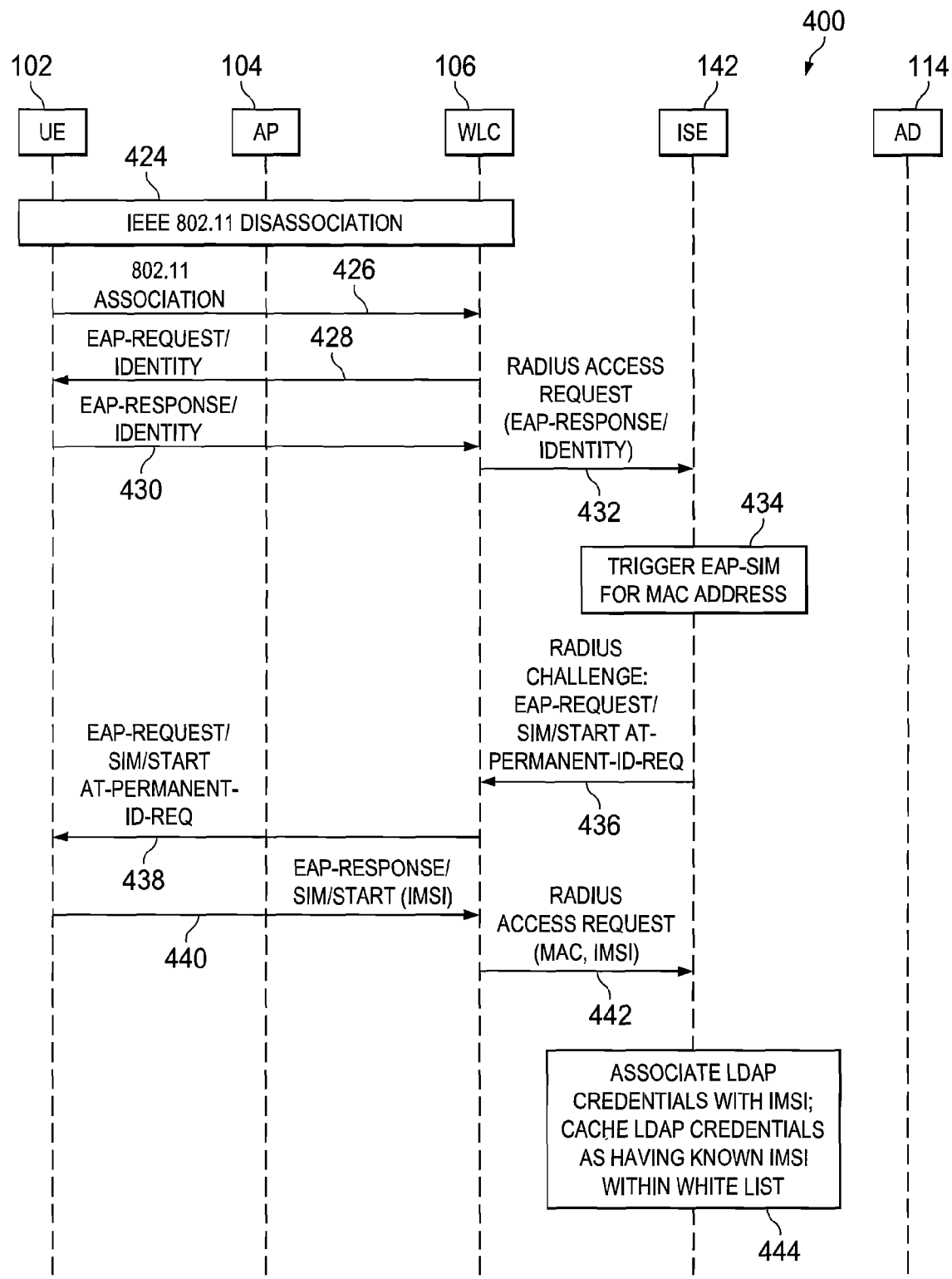
Figure 4C:
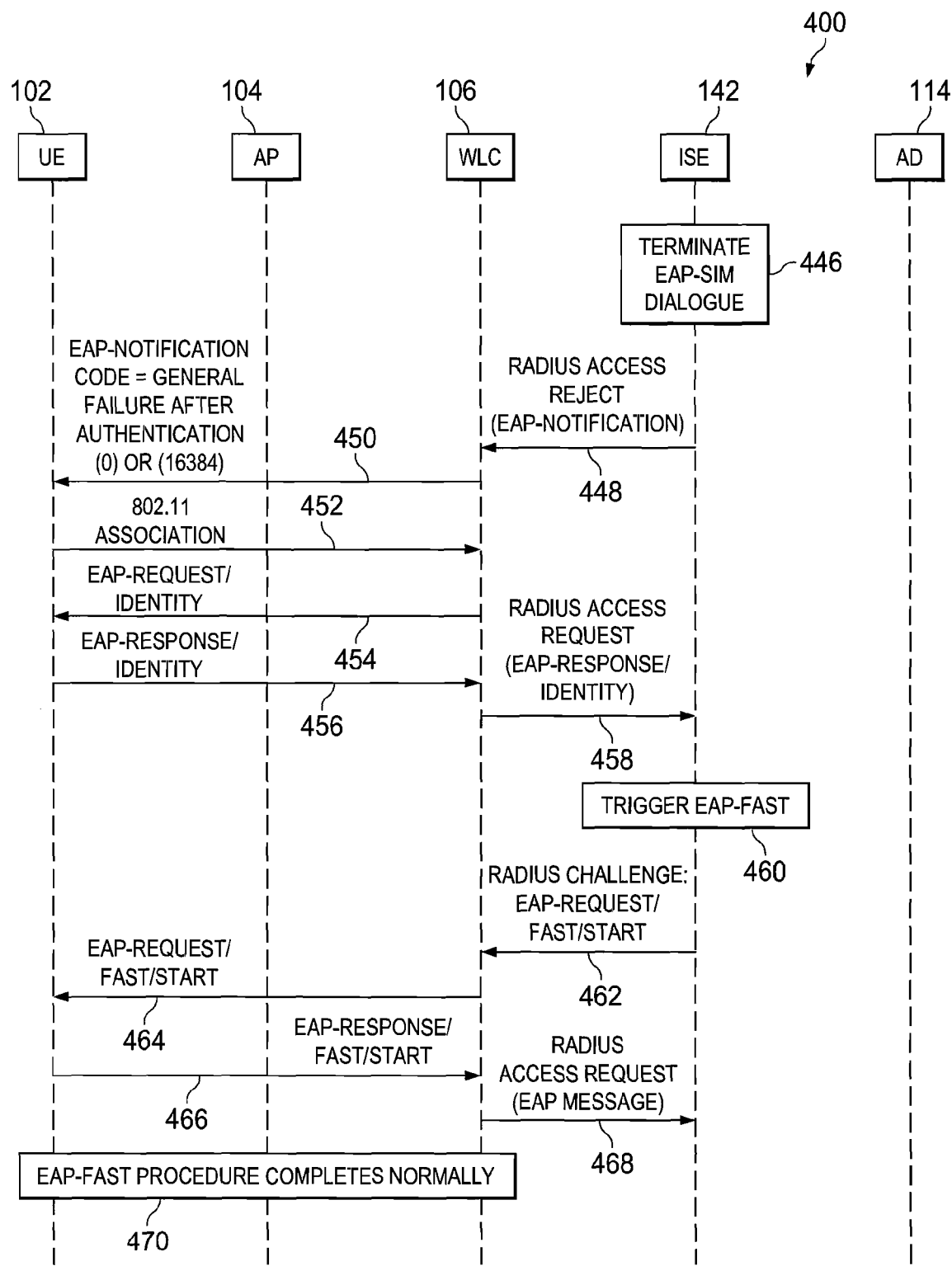

Referring now to FIGS. 4A-4C, FIGS. 4A-4C are a simplified flow diagram depicting a flow 400 associated with whitelist management according to another embodiment. In the embodiment illustrated in FIGS. 2A-2B, WLC 106 and ISE 142 may be required to be configured with new functionality to support the operations of FIGS. 2A-2B. In the embodiment illustrated in FIGS. 4A-4C, only the ISE 142 is required to be configured with the capability to support the operations of FIGS. 4A-4C, while other network elements may be utilized in their conventional form.

In 402, user equipment 102 authenticates to ISE 142 of the enterprise using the WiFi network of the enterprise. In a particular embodiment, user equipment 102 authenticates with ISE 142 using EAP messaging based upon using Active Directory authentication information received from AD 114. In 404, ISE 142 receives a MAC address associated with user equipment 102 from user equipment 102. In a particular embodiment, the MAC address is an IEEE MAC-48 address. In 406, ISE 142 sends a LDAP credentials request to AD 114. The LDAP credentials request includes a request for AD 114 to provide enterprise user identity credentials, such as LDAP credentials, associated with the MAC address. In 408, AD 114 retrieves the LDAP credentials from user identity store 116 and sends an LDAP credentials response including the LDAP credentials to ISE 142. In 410, ISE 142 associates the LDAP credentials of the user with the MAC address of user equipment 102.

In 412, ISE 142 determines if the LDAP credentials have a known IMSI in whitelist 144. If the LDAP credentials have a known IMSI within whitelist 144, the flow described in FIGS. 4A-4C ends. However, if the LDAP credentials do not have a known IMSI in whitelist 144 the flow 400 continues to 414. In 414, ISE 142 sends a RADIUS Access Accept (EAP Success) message have a CLASS attribute of "IMSI Required" to WLC 106. In 416, WLC 106 sends an EAP Success message to user equipment 102. In 418, WLC 106 sends a RADIUS Accounting Start message including a CLASS attribute of "IMSI Required" to ISE 142.

In 420, ISE 142 executes a script based on the reception of the CLASS attribute to trigger a Change of Authorization (CoA) for the MAC address. In ISE 142 sends a RADIUS Disconnect Mode message to WLC 106. In 424, WLC 106 performs an IEEE disassociate user equipment 102 from the wireless network. In 426, user equipment 102 sends an IEEE 802.11 association message 426 to WLC 106 in order to reassociate with the wireless network. In 428, WLC 106 sends an EAP-REQUEST/Identity message to user equipment 102. In response, user equipment 102 sends an EAP-RESPONSE/Identity message to WLC 106. In 432, WLC 106 sends a RADIUS Access Request (EAP-RESPONSE/Identity) message to ISE 142. In 142, ISE 142 triggers an EAP-SIM procedure for the MAC address.

In 436, ISE 142 sends a RADIUS Challenge: EAP-REQUEST/SIM/START message having an AT-PERMANENT-ID-REQ parameter to WLC 106. In 438, WLC 106 sends an EAP-REQUEST/SIM/START message having an AT-PERMANENT-ID-REQ parameter. In 440, user equipment 102 sends an EAP-RESPONSE/SIM/START message including the IMSI associated with user equipment 102 to WLC 106. In 442, WLC 106 sends a RADIUS Access Request message including the MAC address and IMSI associated with user equipment 102 to ISE 142. In 444, ISE 142 associates the LDAP credentials with the IMSI and caches the LDAP credentials as having a known IMSI within whitelist 144. In 446, ISE 142 terminates the EAP-SIM dialogue procedure. In 448, ISE 142 sends a RADIUS Access Reject (EAP-NOTIFICATION) message to WLC 106. In 450, WLC 106 sends an EAP-NOTIFICATION having a code=General Failure After Authentication (0) or (16384) to user equipment 102.

Because it is necessary to ensure that user equipment 102 gets back on the enterprise network, an EAP exchange is initiated. In 452, user equipment 102 sends an 802.11 Association message to WLC 106. In 454, WLC 106 sends an EAP-Request/Identity message to user equipment 102. In 456, user equipment 102 sends an EAP-RESPONSE/IDENTITY message to WLC 106. In 458, WLC 106 sends a RADIUS Access Request (EAP-RESPONSE/Identity) message to ISE 142. In 460, ISE 142 triggers an EAP-FAST EAP-FAST (Flexible Authentication via Secure Tunneling) procedure. In 462, ISE 142 sends a RADIUS CHALLENGE: EAP-REQUEST/FAST/START message to WLC 106.

In 464, WLC 106 sends an EAP-REQUEST/FAST/START message to user equipment 102. In 466, user equipment 102 sends an EAP-RESPONSE/FAST/START message to WLC 106. In 468, WLC 106 sends a RADIUS Access Request (EAP Message) message to ISE 142. In 470, the EAP-FAST procedure completes normally. Accordingly, flow 400 of FIGS. 4A-4C to associate an Enterprise identity credential with an IMSI automatically generates whitelist 144 to enable the offering of differentiated services to enterprise employees such as prioritized resources or access to the enterprise service environment. User equipment 102 may subsequently access the enterprise network in the same or a similar manner as described in FIG. 3.

Figure 5:
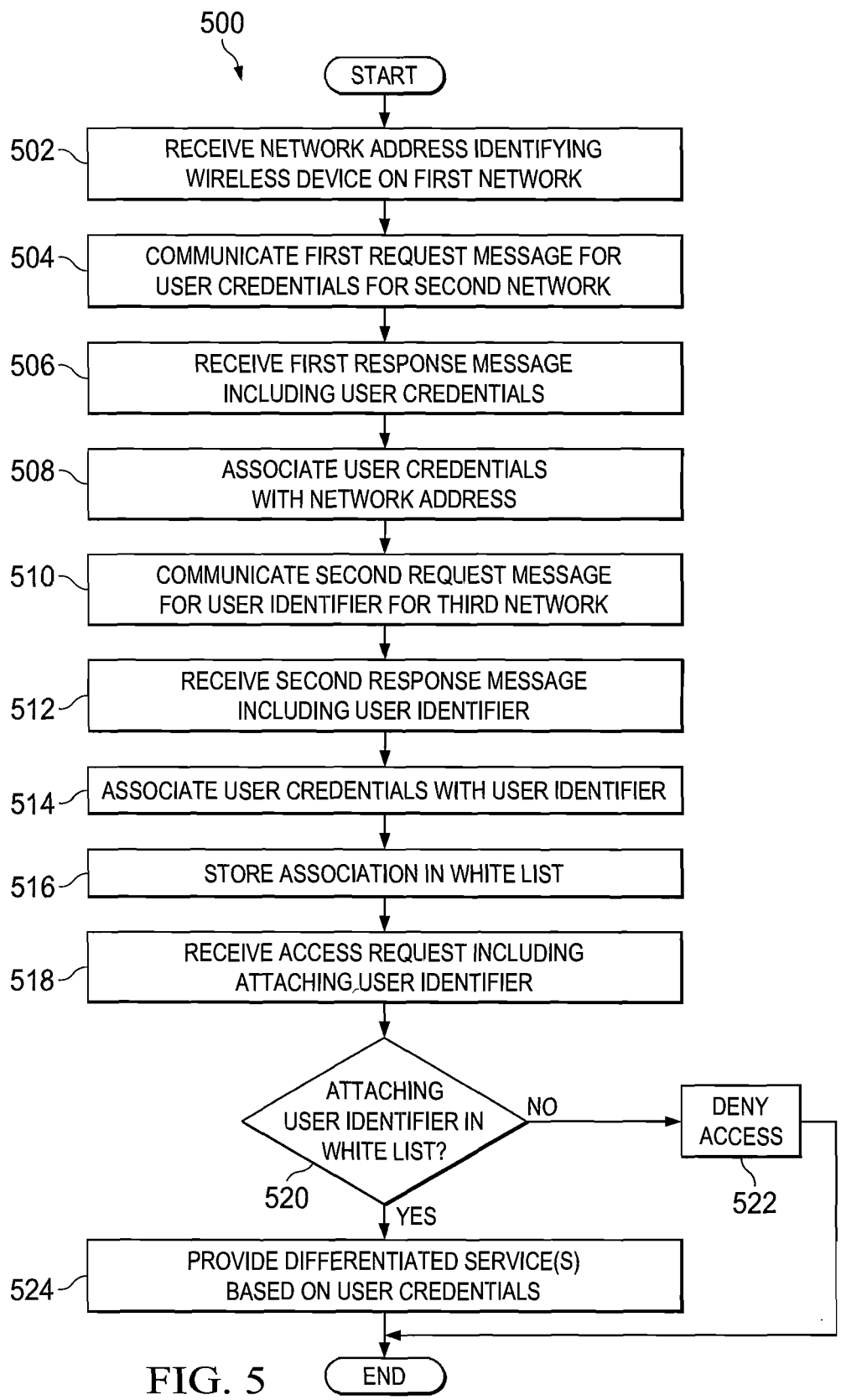
FIG. 5 is a simplified flow diagram that illustrates example operations associated with whitelist management in an enterprise small cell environment in accordance with one embodiment of the present disclosure.

Referring now to FIG. 5, FIG. 5 is a simplified flow diagram that illustrates example operations 500 associated with whitelist management in an enterprise small cell environment in accordance with one embodiment of the present disclosure. In 502, a first network element receives a network address associated with a wireless device. The network address identifies the wireless device on a first network. In a particular embodiment, the wireless device includes user equipment 102. In still another particular embodiment, the network address is a MAC address of the wireless device. In still another particular embodiment, the first network includes a WiFi network. In still another particular embodiment, the first network element is an authentication server such as AAA server 112. In 504, the network element communicates a first request message to a directory service associated with a second network. The first request message includes a request for user credentials identifying a user associated with the wireless device on the second network. In a particular embodiment, the directory service includes an active directory service. In still another particular embodiment, the second network includes an enterprise network associated with the directory service. In still another particular embodiment, the user credentials include LDAP credentials. In 506, the first network element receives a first response message from the directory service.

The first response message includes the user credentials. In 508, the first network element associates the user credentials with the network address.

In 510, the first network element communicates a second request message to a second network element. The second request message includes a request for a user identifier identifying the user on a third network. In a particular embodiment, the user identifier is an IMSI. In still another particular embodiment, the second request message includes an attribute indicating a request for the second network element to initiate recovery of the user identifier. In still another particular embodiment, the second request message is a RADIUS Access Accept message. In still another embodiment, the second network element includes a wireless controller. In still another embodiment, the third network is a cellular network such as one or more of a small cell network, femtocell network, a 3G network, a 4G network, a GSM network, or any other cellular network.

In 512, the first network element receives a second response message from the second network element including the user identifier. In a particular embodiment, the second response message is a RADIUS Access Request message. In still another particular embodiment, the second response message further includes the network address. In 514, the first network element associates the user credentials with the user identifier. In 516, the first network element stores the association of the user credentials and the user identifier in a whitelist such as whitelist 144.

In a subsequent operations, the first network element receives an access request including an attaching user identifier from an attaching wireless device in 518. The access request is indicative of a request by an attaching wireless device to access one or more services of the second network. In a particular embodiment, the attaching wireless device is the same wireless device as provisioned within the whitelist in operations 502-516. In 520, the first network element determines whether the attaching user identifier matches a user identifier in the whitelist. When it is determined that the attaching user identifier does not match a user identifier in the whitelist, first network element denies access to the attaching wireless device in 522 and the operations end. When it is determined that the attaching user identifier matches a user identifier in the whitelist, first network element provides one or more differentiated services of the second network based upon the user credentials associated with the matching user identifier in the whitelist and the operations end.

In regards to the internal structure associated with communication system 100, each of femtocell/WiFi AP 104, WLC 106, and AAA server 112 can include memory elements for storing information to be used in achieving the whitelist management operations, as outlined herein. Additionally, each of these devices may include a processor that can execute software or an algorithm to perform the whitelist management activities as discussed in this Specification. These devices may further keep information in any suitable memory element [random access memory (RAM), read only memory (ROM), an erasable programmable read only memory (EPROM), an electrically erasable programmable ROM (EEPROM), etc.], software, hardware, or in any other suitable component, device, element, or object where appropriate and based on particular needs. Any of the memory items discussed herein should be construed as being encompassed within the broad term 'memory element.' The information being tracked or sent to femtocell/WiFi AP 104, WLC 106, and AAA server 112 could be provided in any database, register, control list, cache, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements and mobile nodes can also include suitable interfaces for receiving, transmitting, and/or otherwise communicating data or information in a network environment.

Note that in certain example implementations, the whitelist management functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements [as shown in FIG. 1] can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors [as shown in FIG. 1] could transform an element or an article (e.g., data) from one state or thing to another state or thing. In another example, the whitelist management activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an EPROM, an EEPROM) or an ASIC that includes digital logic, software, code, electronic instructions, or any suitable combination thereof.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and further can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the previously described activities illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and signaling protocols, communication system 100 may be applicable to other exchanges, routing protocols, or routed protocols in which whitelists are utilized in order to provide and limit access to a network. Moreover, although communication system 100 has been illustrated with reference to particular elements and operations that facilitate the communication process, these elements and operations may be replaced by any suitable architecture or process that achieves the intended functionality of communication system 100.

In a separate endeavor, communication system 100 may generally be configured or arranged to represent a 3G architecture applicable to UMTS environments in accordance with a particular embodiment. However, the 3G architecture is offered for purposes of example only and may alternatively be substituted with any suitable networking system or arrangement that provides a communicative platform for communication system 100. Moreover, the present disclosure is equally applicable to other cellular and/or wireless technology including CDMA, Wi-Fi, WiMAX, etc.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a network address associated with a wireless device at a first network element, the network address identifying the wireless device on a first network;
   receiving user credentials from a directory service associated with a second network, the user credentials identifying a user associated with the wireless device on the second network;
   associating the user credentials with the network address;
   communicating a request message to a second network element, the request message including a request for a user identifier identifying the user on a third network;
   receiving a response message from the second network element including the user identifier;
   associating the user credentials with the user identifier; and
   storing the association of the user credentials and the user identifier in a whitelist.

2. The method of claim 1, further comprising:
   receiving an access request including an attaching user identifier, the access request indicative of a request by an attaching wireless device to access one or more services of the second network; and
   determining whether the attaching user identifier matches the user identifier in the whitelist.

3. The method of claim 2, further comprising providing one or more services of the second network to the attaching wireless device based upon the user credentials associated with the matching user identifier in the whitelist when the attaching user identifier matches the user identifier in the whitelist.

4. The method of claim 1, wherein the network address is a MAC address of the wireless device.

5. The method of claim 1, wherein the first network includes a WiFi network.

6. The method of claim 1, wherein the second network includes an enterprise network associated with the directory service.

7. The method of claim 1, wherein the third network includes a cellular network.

8. The method of claim 1, wherein the user identifier includes an International Mobile Subscriber Identity (IMSI).

9. The method of claim 8, wherein an Extensible Authentication Protocol (EAP) exchange is terminated prematurely after the user identifier has been recovered.

10. The method of claim 9, wherein the user identifier is recovered using the first network using an initial EAP-SIM exchange.

11. The method of claim 9, wherein the user identifier is recovered using the first network using an initial EAP-AKA exchange.

12. The method of claim 1, wherein the second network element includes a wireless controller.

13. One or more non-transitory media that includes code for execution and when executed by a processor operable to perform operations comprising:
   receiving a network address associated with a wireless device at a first network element, the network address identifying the wireless device on a first network;
   receiving user credentials from a directory service associated with a second network, the user credentials identifying a user associated with the wireless device on the second network;
   associating the user credentials with the network address;
   communicating a request message to a second network element, the request message including a request for a user identifier identifying the user on a third network;
   receiving a response message from the second network element including the user identifier;
   associating the user credentials with the user identifier; and
   storing the association of the user credentials and the user identifier in a whitelist.

14. The media of claim 13, wherein the operations further include:
   receiving an access request including an attaching user identifier, the access request indicative of a request by an attaching wireless device to access one or more services of the second network; and
   determining whether the attaching user identifier matches the user identifier in the whitelist.

15. The media of claim 14, wherein the operations further include providing one or more services of the second network to the attaching wireless device based upon the user credentials associated with the matching user identifier in the whitelist when the attaching user identifier matches the user identifier in the whitelist.

16. The media of claim 13, wherein the first network includes a WiFi network.

17. The media of claim 13, wherein the second network includes an enterprise network associated with the directory service.

18. The media of claim 13, wherein the third network includes a cellular network.

19. The media of claim 1, wherein the user identifier includes an International Mobile Subscriber Identity (IMSI).

20. A network element, comprising:
a memory element configured to store electronic code;
a processor operable to execute instructions associated with the electronic code; and
a module coupled to the memory element and the processor, wherein the network element is configured for:
receiving a network address associated with a wireless device at a first network element, the network address identifying the wireless device on a first network;
receiving user credentials from a directory service associated with a second network, the user credentials identifying a user associated with the wireless device on the second network;
associating the user credentials with the network address;
communicating a request message to a second network element, the request message including a request for a user identifier identifying the user on a third network;
receiving a response message from the second network element including the user identifier;
associating the user credentials with the user identifier; and
storing the association of the user credentials and the user identifier in a whitelist.

21. The network element of claim 20, wherein the network element is further configured for:
receiving an access request including an attaching user identifier, the access request indicative of a request by an attaching wireless device to access one or more services of the second network; and
determining whether the attaching user identifier matches the user identifier in the whitelist.

22. The network element of claim 21, wherein the operations further include providing one or more services of the second network to the attaching wireless device based upon the user credentials associated with the matching user identifier in the whitelist when the attaching user identifier matches the user identifier in the whitelist.

23. The network element of claim 20, wherein the first network includes a WiFi network.

24. The network element of claim 20, wherein the second network includes an enterprise network associated with the directory service.

25. The network element of claim 20, wherein the third network includes a cellular network.

26. The network element of claim 20, wherein the user identifier includes an International Mobile Subscriber Identity (IMSI).

* * * * *